(12) United States Patent
Kaufman et al.

(10) Patent No.: US 11,919,405 B2
(45) Date of Patent: Mar. 5, 2024

(54) VEHICLE WITH AN INTEGRATED CHARGING SYSTEM

(71) Applicant: Cummins Inc., Columbus, IN (US)

(72) Inventors: Patrick Kaufman, Vacaville, CA (US);
Joerg Ferchau, Morgan Hill, CA (US);
Elizabeth Weitzel, Vacaville, CA (US)

(73) Assignee: Cummins Inc., Columbus, IN (US)

( * ) Notice: Subject to any disclaimer, the term of this patent is extended or adjusted under 35 U.S.C. 154(b) by 149 days.

(21) Appl. No.: 17/266,435

(22) PCT Filed: Sep. 16, 2019

(86) PCT No.: PCT/US2019/051267
§ 371 (c)(1),
(2) Date: Feb. 5, 2021

(87) PCT Pub. No.: WO2020/056401
PCT Pub. Date: Mar. 19, 2020

(65) Prior Publication Data
US 2021/0291670 A1 Sep. 23, 2021

Related U.S. Application Data

(60) Provisional application No. 62/731,806, filed on Sep. 14, 2018.

(51) Int. Cl.
*B60L 53/10* (2019.01)
*B60L 50/61* (2019.01)
(Continued)

(52) U.S. Cl.
CPC ............ *B60L 53/11* (2019.02); *B60L 50/61* (2019.02); *B60L 55/00* (2019.02); *B60L 58/12* (2019.02); *H02J 7/1423* (2013.01)

(58) Field of Classification Search
CPC .......... B60L 53/11; B60L 50/61; B60L 55/00; B60L 58/12; B60L 53/20; B60L 53/53;
(Continued)

(56) References Cited

U.S. PATENT DOCUMENTS 7,434,636 B2 * 10/2008 Sutherland .............. F03D 13/10
180/2.2
7,443,049 B1    10/2008 Jones
(Continued)

FOREIGN PATENT DOCUMENTS

| CA | 2647638 A1 * | 11/2006 | ............... B60K 6/30 |
| CA | 2623398 A1 * | 4/2007 | ............... B60K 6/26 |

(Continued)

OTHER PUBLICATIONS

C. C. Chan, "The State of the Art of Electric, Hybrid, and Fuel Cell Vehicles," in Proceedings of the IEEE, vol. 95, No. 4, pp. 704-718, Apr. 2007, doi: 10.1109/JPROC.2007.892489. (Year: 2007).*

(Continued)

*Primary Examiner* — M Baye Diao
(74) *Attorney, Agent, or Firm* — Faegre Drinker Biddle & Reath LLP

(57) ABSTRACT

A system is provided for performing an electric power charging process for one or more electric devices. Included in the system is a charging system integrated into the electric vehicle by installing the charging system on-board the electric vehicle. The charging system is configured to receive electric power from the electrified vehicle's powertrain, convert the received electric power into an electric current capable of charging the one or more electric devices, and charge the one or more electric devices based on the converted electric current.

16 Claims, 2 Drawing Sheets

(51) Int. Cl.
  *B60L 55/00* (2019.01)
  *B60L 58/12* (2019.01)
  *H02J 7/14* (2006.01)

(58) Field of Classification Search
  CPC ...... B60L 53/57; B60L 2260/22; B60L 50/62;
       H02J 7/1423; Y02E 60/00; Y02T 10/62;
       Y02T 10/70; Y02T 10/7072; Y02T 90/12;
       Y02T 90/14; Y04S 10/126
  USPC .......................................................... 320/109
  See application file for complete search history.

(56) References Cited

U.S. PATENT DOCUMENTS

| | | | | |
|---|---|---|---|---|
| 8,068,947 | B2* | 11/2011 | Conlon | B60L 50/16 |
| | | | | 475/5 |
| 8,933,661 | B2 | 1/2015 | Nergaard | H02J 50/10 |
| | | | | 320/108 |
| 9,153,847 | B2* | 10/2015 | Harty | B60L 53/665 |
| 9,365,122 | B2 | 6/2016 | Kajouke | |
| 10,118,605 | B2* | 11/2018 | Zhao | B60K 6/448 |
| 10,124,679 | B2* | 11/2018 | Zettel | B60L 7/10 |
| 10,759,298 | B2* | 9/2020 | Wang | B60L 58/21 |
| 10,882,412 | B2* | 1/2021 | Mrlik | H02J 7/35 |
| 10,919,401 | B2* | 2/2021 | Elshaer | H02J 50/12 |
| 11,479,139 | B2* | 10/2022 | Smolenaers | H02J 7/345 |
| 11,482,948 | B2* | 10/2022 | Lehn | B60L 53/24 |
| 11,491,883 | B2* | 11/2022 | Khaligh | B60L 53/22 |
| 2006/0250902 | A1* | 11/2006 | Bender | B60L 50/62 |
| | | | | 369/1 |
| 2009/0091291 | A1* | 4/2009 | Woody | B60W 10/26 |
| | | | | 701/2 |
| 2009/0250277 | A1 | 10/2009 | Grand et al. | |
| 2011/0298219 | A1 | 12/2011 | Wenger et al. | |
| 2012/0299531 | A1 | 11/2012 | Prosser | |
| 2013/0020993 | A1* | 1/2013 | Taddeo | B60L 53/65 |
| | | | | 320/109 |
| 2014/0089064 | A1 | 3/2014 | Hyde et al. | |
| 2017/0050529 | A1 | 2/2017 | Lambert et al. | |
| 2017/0355373 | A1 | 11/2017 | Dalum | |
| 2018/0201148 | A1* | 7/2018 | Donnelly | G05D 1/0088 |
| 2020/0298722 | A1* | 9/2020 | Smolenaers | H02J 7/345 |

FOREIGN PATENT DOCUMENTS

| | | | | |
|---|---|---|---|---|
| CN | 103010035 | A | 4/2013 | |
| CN | 107117046 | A | 9/2017 | |
| DE | 102014219744 | A1* | 4/2015 | ............. B60L 1/003 |
| FR | 3047448 | A1 | 8/2017 | |
| JP | H11285109 | A | 10/1999 | |
| KR | 20130071923 | A* | 7/2013 | ................ H02J 7/14 |

OTHER PUBLICATIONS

European Search Report and Written Opinion for EP 19859786, filed Sep. 16, 2019, dated Jan. 4, 2022.
International Search Report and Written Opinion issued by the ISA/US, Commissioner for Patents, dated Jan. 22, 2020, for International Application No. PCT/US2019/051267; 6 pages.

\* cited by examiner

VEHICLE WITH AN INTEGRATED CHARGING SYSTEM

CROSS-REFERENCE TO RELATED APPLICATIONS

The application is a national phase filing of International Application No. PCT/US2019/051267, filed Sep. 16, 2019, which claims priority to U.S. Application No. 62/731,806, titled "VEHICLE WITH AN INTEGRATED CHARGING SYSTEM," filed on Sep. 14, 2018, which are herein incorporated by reference in their entirety and for all purposes.

TECHNICAL FIELD

This disclosure relates generally to methods and systems for charging vehicles and electric devices, and more particularly to vehicles having integrated charging systems to control power charging processes of the vehicles and electric devices.

BACKGROUND

Recently, the need to reduce fossil fuel consumption and reduce emissions in various systems, such as generators, automobiles, and other vehicles powered by internal combustion engines is continuing to grow in light of new governmental regulations, customer demand, and in an effort to reduce the operating costs of such systems. In an attempt to address these needs, some efforts have included the use of both an electric motor and an internal combustion engine (ICE), such as, for example, a hybrid electric vehicle (HEV) and a plug-in hybrid electric vehicle (PHEV). In some cases, a pure electric vehicle (EV) operated by a battery only has been introduced to address the needs.

Thus, the electric vehicles (e.g., both the hybrid and pure electric vehicles) provide an alternative to conventional fuel engine systems for either supplementing or completely replacing the engine systems, such as the ICEs. In one example, an alternative vehicle is known as an extended range electric vehicle (EREV). In the EREV, primary electric drive is achieved with a battery or related rechargeable energy storage system (RESS) that acts as a direct current (DC) voltage source to a motor, generator or transmission that in turn can be used to provide the energy needed to rotate one or more of the vehicle's wheels. When the electrical charge from the RESS has been depleted, backup power may come from the ICE to provide auxiliary on-board electrical energy generation.

For charging the electric vehicle, an external power source, such as a charging station of a power grid system, is electrically coupled to a battery assembly of the electric vehicle to allow recharging of the battery assembly. For example, a connector cable of the electric vehicle can be plugged into an electrical outlet of a commercial charging station for charging the electric vehicle. However, charging the electric vehicles, such as the EV, HEV, and PHEV, can be challenging due to different energy requirements of each vehicle and various power sources provided from the external power source to different electric vehicles. Further, the charging station may be fixedly located in an undesired site where the electric vehicles cannot readily reach. As a result, an unwanted increase of operational expenses and time can occur. Such difficult charging processes can adversely impact power charging processes of the electric vehicles and other electric devices. Moreover, properly controlling the power charging processes is difficult and convoluted due to varying requirements of the electric vehicles and electric devices.

Accordingly, there are opportunities to develop enhanced power charging systems and methods that can more efficiently control the power charging processes of the electric vehicles and related electric devices.

SUMMARY

Various embodiments of the present disclosure relate to methods and systems for charging one or more electric energy storage devices. Some of the embodiments as disclosed include integrating a charging system into an electric vehicle by installing the charging system on-board the electric vehicle; receiving, by the charging system, electric power from a powertrain of the electric vehicle; converting the received electric power into an electric current capable of charging the one or more electric energy storage devices; and charging the one or more electric energy storage devices based on the converted electric current. In one embodiment, the one or more electric energy storage devices comprise one or more batteries. In another embodiment, the one or more electric energy storage devices is installed in the electric vehicle. In yet another embodiment, the one or more electric energy storage devices is a power grid system.

In one embodiment, charging the one or more electric energy storage devices is performed while the electric vehicle is in operation. In another embodiment, charging the one or more electric energy storage devices is performed while the electric vehicle is in a stationary condition. One embodiment further includes controlling the electric current to the one or more electric energy storage devices by limiting the electric current charged to at least one of the one or more electric energy storage devices. Another embodiment further includes determining how to control the electric current based on at least one of: thermal limits, real-time conditions of components, charge priority of connected devices, time limits of charge opportunity, energy capacities, maximum life of components, noise considerations, and emissions considerations.

Some embodiments of the present disclosure relate to methods and systems for charging one or more electric vehicles by: integrating a charging system into an electrified vehicle by installing the charging system on-board the electric vehicle; receiving, by the charging system, electric power from a powertrain of the electric vehicle; converting the received electric power into an electric current capable of charging one or more additional electric vehicles; and charging the one or more additional electric vehicles based on the converted electric current. One embodiment further includes receiving state of charge (SOC) information of the one or more additional electric vehicles; and based on the SOC information, prioritizing charging times or power levels to one of the one or more additional electric vehicles that has a lowest SOC or a priority charging status. Another embodiment further includes controlling the electric current to the one or more additional electric vehicles by limiting the electric current to at least one of the one or more additional electric vehicles. In one aspect of the embodiment, the electric current is controlled based on information received from a telematics module installed in the electric vehicle.

Some embodiments of the present disclosure relate to systems for performing an electric power charging process for one or more electric energy storage devices. Such systems include a charging system configured to be electrically connected to an electric vehicle. The charging system is integrated into the electric vehicle by installing the charging system on-board the electric vehicle, and the charging system is configured to receive electric power from a powertrain of the electric vehicle, convert the received electric power into an electric current capable of charging the one or more electric energy storage devices, and charge the one or more electric energy storage devices based on the converted electric current. In one embodiment, the system further includes a controller operative to control the electric current to the one or more electric energy storage devices by limiting the electric current charged to at least one of the one or more electric energy storage devices. In another embodiment, the system further includes a telematics module configured to be operatively connected to the electric vehicle, and the controller is operative to control the electric current based on information received from the telematics module.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The above mentioned and other features and objects of this disclosure, and the manner of attaining them, will become more apparent and the disclosure itself will be better understood by reference to the following description of an embodiment of the disclosure taken in conjunction with the accompanying drawings, wherein.

Figure 1:
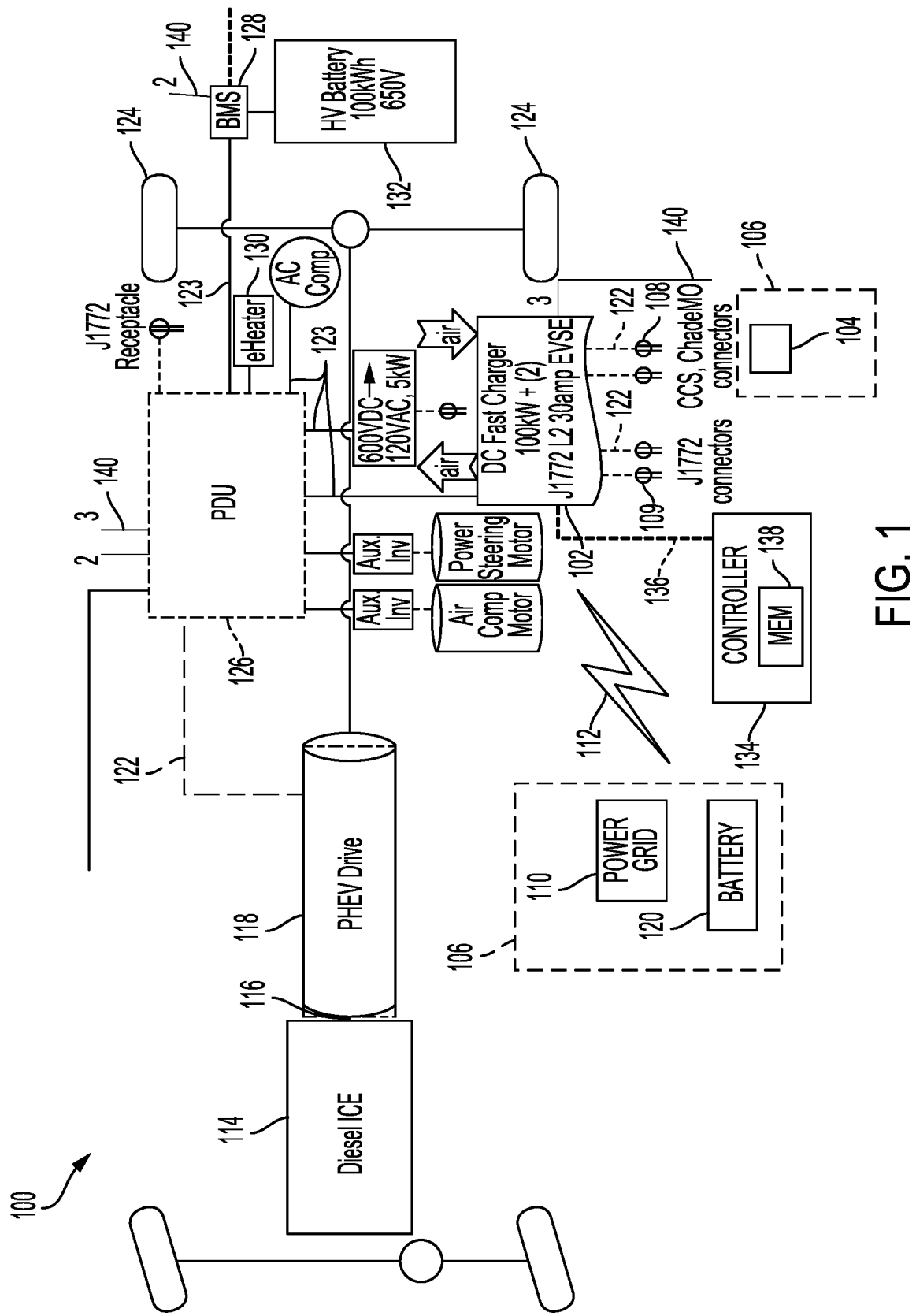
FIG. 1 is a schematic diagram of an engine and electric system featuring an integrated charging system for electric vehicles in accordance with embodiments of the present disclosure.

Corresponding reference characters indicate corresponding parts throughout the several views. Although the drawings represent embodiments of the present disclosure, the drawings are not necessarily to scale, and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION

As utilized herein, terms "component," "system," "interface," "module," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

FIG. 1 shows an electric vehicle 100 having an integrated bi-directional charging system 102 installed on board the electric vehicle 100 and configured to provide electric power to one or more other additional electric vehicles 104 or electric devices 106 according to an embodiment. In some embodiments, the charging system 102 is capable of charging not only the other electric vehicles 104 (or the electric devices 106) but also the electric vehicle 100 in which it is installed. Also, the charging system 102 is capable of discharging from the electric vehicle 100. In this example, the electric devices 106 may refer to any electric apparatuses including the other electric vehicles 104, a power grid system 110, a power storage system 120 (e.g., external batteries), and the like. It is advantageous that the charging system 102 can deploy the charging capability to locations that are hard to reach by integrating the charging system 102 into one of the other electric vehicles 104 that can easily meet the charging demand at the remote locations with greater flexibility, speed, remote monitoring capability and efficiency. In some examples, the external power storage system 120 or the other electric vehicles 104 may provide direct current (DC) power to the electric vehicle 100. The electric vehicle 100 may also convert the DC power to alternative current (AC) power, which may be used to sustain or charge a rechargeable energy storage supply 132 (e.g., a battery pack) on-board the electric vehicle 100.

In various embodiments, the integrated charging system 102 can be used with vehicles that include battery systems and/or motor-generators, such as the vehicles disclosed in U.S. Pat. No. 9,914,361, filed Nov. 20, 2016, entitled "Vehicle with AC-to-DC Inverter System for Vehicle-to-Grid Power Integration" and the vehicles disclosed in U.S. Pat. No. 9,505,311, filed Oct. 19, 2015, entitled "Vehicle with AC-to-DC Inverter System for Vehicle-to-Grid Power Integration", all of which are hereby incorporated herein by reference in their entireties for all that they teach and for all purposes. These two patent applications disclose vehicles that are capable of connecting to the power grid system 110 and that include a prime mover and at least one motor generator.

In FIG. 1, the other electric vehicles 104 can be plugged to the charging system 102 via one or more electrical connectors 108 for performing a power charging process of electric vehicles 104. For example, the electrical connectors 108 can be Combo Charging System (CCS) 1.0/2.0 connectors or Charge de Move (CHAdeMO) plugs configured to be electrically coupled to the other electric vehicles 104 and the charging system 102 via a link 122, such as a voltage link. Other suitable fast charge connectors, such as Supercharger or SAE Combo connectors, are also contemplated to suit different applications. In other embodiments, proprietary connectors can be used for performing the power charging process.

The other electric devices 106 can be plugged into one or more electrical connectors 109 to be connected to the charging system 102 for performing the power charging process of the electric devices 106. For example, the electric connectors 109 can be SAE J1772 or J3068 plugs configured to be electrically connected to the electric devices 106 (or the other electric vehicles 104) and the charging system 102 via the link 122. Other suitable electric vehicle conductive charge couplers are also contemplated. In another example, the electric connectors 109 can be any AC or DC voltage connectors.

In various embodiments, the charging system 102 can be connected to the power grid system 110 and/or the power storage system 120 via a network 112 electrically connected to the charging system 102, for example, using the electrical connectors 109 via the link 122. In one embodiment, the power grid system 10 can be a grid system implemented in a specific commercial facility, such as a commercial depot or charging station. In another embodiment, the power grid system 10 can be a grid system implemented in a grid network incorporating a plurality of power stations, such as power plants and other power-generating facilities. It is contemplated that the present disclosure can be applied to the electric vehicle 100 having a parallel hybrid system, a range-extended vehicle or a series hybrid vehicle to suit different applications. As such, the electric vehicle 100 includes any electric vehicles having an electric propulsion system (e.g., the hybrid, pure electric, and/or range-extended vehicles).

Although the electric vehicle 100 with an internal combustion engine 114 (e.g., diesel engine) is shown, the present disclosure can be applied to a pure electric vehicle powered by only batteries without the engine 114. In this example, the electric vehicle 100 can include the internal combustion engine 114 having a crankshaft 116 and a crankshaft sprocket (not shown) coupled to the crankshaft 116. The engine 114 is not particularly limited to any certain type and can be any type of reciprocating engine, such as a diesel engine or a gasoline engine. For example, the internal combustion engine 114 can be on-board (e.g., the range-extended vehicle) or off-board (e.g., a genset located at the commercial depot) with respect to the electric vehicle 100.

The electric vehicle 100 can also include an electric powertrain 118 (e.g., PHEV drive or drivetrain) in mechanical communication with the crankshaft sprocket. For example, the electric powertrain 118 can be a traction motor used for propulsion of the electric vehicle 100. In various embodiments, the electric powertrain 118 can be coupled to the engine 114 and a transmission via the crankshaft 116. In various embodiments, the electric powertrain 118 is in mechanical communication with wheels 124 and also is in electrical communication with a power distribution unit (PDU) 126. In various embodiments, the power distribution unit 126 can be a high voltage power distribution unit having an inverter and/or an on-board charger.

In one example, by being in mechanical communication, a relative position can be maintained and the operation of the engine 114 can continue to be controlled. Also, the electric powertrain 118 is not particularly limited and, for example, can be a motor/generator, synchronous motor, or an induction motor. In another example, by being in electrical communication with the power distribution unit 126, the power distribution unit 126 electrically communicates with the electric powertrain 118 via the link 122 to provide electric power.

Further, the power distribution unit 126 electrically communicates with the charging system 102 via another link 123, such as a DC high voltage link shown in solid lines. In one example, the power distribution unit 126 provides DC electric power to the charging system 102 via the other link 123. As such, the DC electric power can be used to charge the other electric vehicles 104, the electric devices 106, the power grid system 110 and/or the power storage system 120. Thus, it is advantageous that the power charging process can be performed while the electric vehicle 100 is in operation (e.g., while driving). In another example, the power charging process can be performed while the electric vehicle 100 is in a stationary condition (e.g., while parked).

The power distribution unit 126 can also be electrically connected to other components of the electric vehicle 100 to provide electric power. For example, the power distribution unit 126 can be coupled to a battery management system (BMS) 128 and a heater 130 via the link 123. In this example, the rechargeable energy storage supply 132 (e.g., a battery pack) is communicably and/or electrically connected to the BMS 128. Other connectors (e.g., J1772 receptacles) can be connected to the power distribution unit 126 for providing electric power to other electric devices.

In some embodiments, the electric vehicle 100 also includes a controller 134 in electrical communication with the charging system 102 via a communication link 136 and can include a non-transitory memory storage medium 138 storing instruction codes that, when executed by a processor, cause the processor to control the power charging process performed by the charging system 102. In this example, the charging system 102 electrically receives power from the rechargeable energy storage supply 132, such as a battery pack, and the BMS 128 (or the power distribution unit 126) can provide data representative of state-of-charge (SOC) information to the controller 134. The non-transitory memory storage medium 138 and the controller 134 are not particularly limited and can, for example, be physically separate from the electric vehicle 100.

In certain embodiments, the controller 134 can form a portion of a processing subsystem (e.g., a vehicle control unit or an engine control module) including one or more computing devices having memory, processing, and communication hardware. The controller 134 can be a single device or a distributed device, and functions of the controller 134 can be performed by hardware and/or as computer executable instructions on a non-transient computer readable storage medium, such as the non-transitory memory storage medium 138. Other suitable arrangements, such as power charging control algorithms, are also contemplated to suit different applications.

In certain embodiments, the controller 134 includes one or more interpreters, determiners, evaluators, regulators, and/or processors that functionally execute the operations of the controller 134. The description herein including interpreters, determiners, evaluators, regulators, and/or processor emphasizes the structural independence of certain aspects of the controller 134 and illustrates one grouping of operations and responsibilities of the controller 134. Other groupings that execute similar overall operations are understood within the scope of the present disclosure. Interpreters, determiners, evaluators, regulators, and processors can be implemented in hardware and/or as computer instructions on a non-transient computer readable storage medium and can be distributed across various hardware or computer-based components.

Example and non-limiting implementation elements that functionally execute the operations of the controller 134 include: sensors that provide any value determined herein; sensors that provide any value that is a precursor to a value determined herein; datalink and/or network hardware that include: communication chips, oscillating crystals, communication links, cables, twisted pair wiring, coaxial wiring, shielded wiring, transmitters, receivers, and/or transceivers; logic circuits; hard-wired logic circuits; reconfigurable logic circuits in a particular non-transient state configured according to the module specification; any actuator that includes at least an electrical, hydraulic, or pneumatic actuator; a solenoid; an op-amp; analog control elements (springs, filters, integrators, adders, dividers, gain elements); and/or digital control elements.

The operations as described herein include those to interpret and/or to determine one or more parameters or data structures. Interpreting or determining, as utilized herein, includes: receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, receiving a value by which the interpreted parameter can be calculated, and/or referencing a default value that is interpreted to be the parameter value.

As for the network 112, any type of computer network having a collection of computers, servers, and other hardware interconnected by communication channels is contemplated, such as the Internet, Intranet, Ethernet, LAN, etc. In one embodiment, the controller 134 interfaces with the network 112, such as a wireless communication facility (e.g., a Wi-Fi access point). Other similar networks known in the art are also contemplated. For example, the network 112 can be a vehicle-to-grid (V2G) network between the electric vehicles 100, 104 and the power grid system 110, or a vehicle-to-vehicle (V2V) network between a first electric vehicle 100 or 104 and a second electric vehicle 100 or 104. Other suitable arrangements of the electric vehicles 100, 104 including other multiple vehicles are also contemplated to suit the application. For example, the controller 134, the charging system 102, and the power distribution unit 126 can be in communication with a controller area network (CAN) 140 or other serial bus systems for communicating with various components and sensors in the electric vehicle 100.

The controller 134 is configured to control the power charging process of the electric vehicles 104 and/or the electric devices 106 to satisfy one or more mission requirements for the electric vehicles 104 and/or the electric devices 106. Mission requirements refer to enabling conditions required for one or more tasks to be performed by the electric vehicles 104, such as a battery operational period, a battery life time, a battery state of charge, a number of mileage or an area to be covered, and the like. As such, based on a bi-directional information exchange between any two of the electric vehicles 104, the electric devices 106, the power grid system 110, and/or power storage system 120, the power charging process is automatically controlled by the controller 134. In some examples, the electric vehicles 100 and 104 are controlled via over-the-air wireless connections using any of the aforementioned communication channels such that power import and export are managed accordingly. For example, the electric vehicle 100 may be instructed to stop exporting power, recharge for a certain length of time, and then resume exporting power again afterwards, and the electric vehicle 104 may be instructed to be charged only at one or more predetermined time of the day, and so on. In some examples, the electric vehicle 100 may also measure the amount of power exported and/or the length of time spent exporting power in order to log or store such data as charging information, for example, in a database that is in communication with the network 112 as previously explained. For example, the charging information can then be transmitted to the user of the electric vehicle 104 that is being charged, and the user can be billed for the amount of power being charged to the vehicle 104 or the length of time that the electric vehicle 100 has spent charging the other vehicle 104.

In some embodiments, in addition to being able to generate on-board electric power for export from an energy storage system, such as the rechargeable energy storage supply 132, or being able to generate the electric power from an ICE/Generator combination, any vehicle can also (i.e., alternatively or additionally) be connected to an external power source (e.g., wind, solar, battery systems, engine fuel source) and use its on-board electronics and energy storage systems to store and condition the electric power for external vehicles charging through various vehicle chargers in both AC and DC forms. The same capability can be used to charge stationary, non-vehicle, or off-road battery systems. In some examples, a charging vehicle such as the electric vehicle 100 may be connected to an auxiliary energy source, which may include solar panels or solar farms (photovoltaic power station), wind turbines, renewable gas source, hydrogen fuel feed, etc., and the energy provided by such external power source may be converted to exportable AC or DC power, in additional to any on-board fuel the charging vehicle may be carrying. In some examples, the auxiliary energy source may be mobile and mounted directly on the charging vehicle, such as in the case of solar panels or wind turbines.

The electric vehicle 100 is also able to utilize the power export capability of other vehicles that have "V2G" capabilities and can use its on-board electronics and energy storage systems to draw the electric power from one or more of the other electric vehicles 104 and then distribute that to one or more of the other electric vehicles 104 to provide peer-to-peer charging. For example, this functionality is useful when the on-board energy is depleted, or when the engine operation is undesired or impossible. Other suitable applications, such as military or emergency response vehicles, are also contemplated. The same capability can be used to draw power from stationary, non-vehicle, or off-road battery systems. Additionally, the same capacity can be used to charge the stationary, non-vehicle, or off-road battery systems.

The electric vehicle 100 can also transport or store contactless inductive or capacitive chargers that can be deployed to charge the other electric vehicles 104 that require such form of charging. The same capability can be used to charge the stationary, non-vehicle, or off-road battery systems.

The electric vehicle 100 can also be connected to external charging infrastructure where banks of existing chargers are installed, but the grid power is absent. This capability provides the grid power to an external charging infrastructure when the conventional grid power is unavailable.

The electric vehicle 100 can also include charging prioritization control algorithms whereby the vehicle receives or detects state of charge (SOC) information from the other electric vehicles 104 to be charged and can prioritize charging times or power levels to the electric vehicle(s) with the lowest state of charge or with a priority charging status. The electric vehicle 100 can use embedded logic (i.e., prioritize the electric vehicles with lowest SOC if there are limits to the available energy or charge time) or the electric vehicle 100 can receive external instructions via telematics system or telematics module that is operatively coupled thereto. The electric vehicle 100 can also report charging activity, status, and projections via the telematics system.

One or more of the electric vehicles 100 can operate as a mobile charging infrastructure that can drive itself to a target destination site (e.g., concerts, sporting events, etc.), and can also use 4-wheel drive when needed, and a plurality of such electric vehicles 100 can be grouped in a primary/replica relationship wherein the primary vehicle establishes the grid frequency and grid forming characteristics for the replica vehicles to follow.

The electric vehicle 100 also can have the ability to charge separate/transported batteries while en route to deploy those batteries for stationary energy storage applications. For example, a truck can charge depleted stationary energy storage systems or can pick up and transport the batteries and charge them using the vehicle's AC and DC charging capabilities while en route. Redeploying the batteries in emergency management situations may require starting off with depleted batteries which need to be charged at arrival. For these applications of the electric vehicle 100 discussed above, the controller 134 can be used to perform control strategies and energy management policies.

Although the charging system 102 is configured to provide various voltages and phases, the charging system 102 is also capable of operating in an island mode and a grid synchronized mode. In the "island mode," the charging system 102 operates as a grid forming power source and acts as a primary voltage source defining an AC frequency and voltage wave form. In the "grid synchronized mode," the charging system 102 operates as a current source that follows a voltage wave form provided by another source. The export unit is capable of automatically synchronizing and matching an energized (i.e. "live") voltage source of any voltage, frequency and direction. A final connection to a live grid can be made with internal contactors at a precisely correct time to maintain synchronization and protect from an arc flash exposure. The grid synchronized mode also supports loss of grid power with an "intentional Island" feature. This insures that the final load does not experience a power drop outside of the IEEE specification when the primary grid is dropped and the load shifts to the vehicle export system.

The charging system 102 can include computer-executable instructions that include one or more safety features to protect the electric vehicle 100, an operator thereof, and the grid loads. For example, the charging system 102 can automatically detect one or more of the following: misconnection, missing wiring, shorted legs connection, bad grounding, undesired voltage selection, a voltage source outside of IEEE spec, an unexpected voltage being present, a three-phase rotation direction, and a line-to-neutral voltage. If a safety risk is detected, the charging system 102 automatically shuts down and remains unenabled until the safety risk is rectified. In some embodiments, a built-in meter can display any detected voltage, frequency and rotation to the operator even when the charging system 102 is not outputting the electric power.

Another feature of the charging system 102 is the capability for high power grid charging. The charging system 102 can work bi-directional at full power to charge the vehicle's battery. This bi-directional capability provides all necessary hardware for the V2G capability. For example, the charging system 102 can support a high-power vehicle-to-grid energy transfer. In some embodiments, the charging system 102 can be integrated with two-way telematics such that the electric vehicle 100 can support a "Distributed Grid" and can aid in "Peak Shaving."

When the charging system 102 is implemented on a PHEV, the source of energy used for exporting the electric power can be selectable. In a "Zero Emissions" mode, for example, the complete system of the electric vehicle 100 is quiet, clean and has a much lower heat signature, but the energy is finite. In this mode, all electric energy comes from the on-board high voltage batteries, and the duration is dependent on the load and the on-board battery capacity.

On the other hand, in an "Auto Generate" mode, the electric power is available indefinitely at any power rating up to the capacity of the system. This allows for 24/7 continuous power output operation (fuel availability permitting). It can be the most efficient use of an ICE genset through optimizing an engine duty cycle for the power needed. An engine speed may not be directly linked to the AC load, and the high voltage battery system can act as a filter for transient power demands.

Advantageously, it was discovered that a response and power regulation of the charging system 102 can be better than a conventional generator that uses a rotating electric AC machine synchronized to an output frequency. Further, emissions can be lower than a conventional generator per kWh because even at low loads the engine never idles, and it will simply shut down the engine when it is efficient to do so. It was also discovered that during operation, the engine 114 is quieter and cleaner than its conventional generator counterpart. This coupled with the zero emissions capability can allow the electric vehicle 100 to operate in low noise or low emissions restricted areas near population centers. For at least these reasons, a fuel consumption per kilowatt hour is better than a conventional generator.

In various embodiments, the controller 134 can strategically provide the electric power from one or more sources of energy in the powertrain including but not limited to: on-board high voltage batteries (such as the battery 132), motor/generators coupled to drive wheels, motor/generators tied to the combustion engines 114, and fuel cells. The controller 134 can also perform smart management techniques of these energy sources and management of the output of one or more of the electrical "charging" connections. In some examples, the fuel cell may be a hydrogen proton exchange membrane (PEM) or a solid oxide fuel cell (SOFC) that converts a fuel source such as hydrogen, natural gas, or other suitable hydrocarbon to electricity which can then be used to charge the high-voltage batteries, such as the battery 132, on-board the electric vehicle 100. Also, the fuel cell may be used to generate electricity that can be exported in either AC or DC form to charge other electric vehicles, grids, energy storage devices, etc. Furthermore, the fuel cell may be used individually or in conjunction with the battery on a charging vehicle (e.g. the electric vehicle 100) such that the fuel cell reduces the capacity and cost of the battery system on the charging vehicle.

In some embodiments, one or more vehicle charging plugs, such as the electrical connectors 108 and 109, can manipulate the standard control signals provided by the charge plugs to the vehicles being charged. In the present disclosure, the control signals can be variable and controlled by a central software managing an electric energy flow. An energy flow strategy can be determined based on multiple factors, such as thermal limits and real time conditions of components, charge priority of connected devices, time limits of charge opportunity, energy capacities, maximum life of components, noise considerations, emissions considerations.

For example, the charging system 102 can utilize one or more DC-to-DC inverters for efficiency to convert the DC voltage of the on-board battery pack 132 to the appropriate DC voltage of a target vehicle being charged. These chargers can use common vehicle charging standards for the DC power, such as the CHAdeMO or SAE CCS 1.0 or CCS 2.0 plugs, to charge target vehicles, such as the electric vehicles 104. Charging system 102 can also use one or more DC-to-AC inverters to power AC high power chargers. These chargers can use common vehicle charging standards for the AC power, such as J1772 or J3068 plugs, to charge target vehicles. In another embodiment, the charging system 102 can use a AC-to-DC inverter to provide DC fast charging in combination with AC charging. Other suitable combinations of inverters and chargers are also contemplated to suit different applications.

Figure 2:
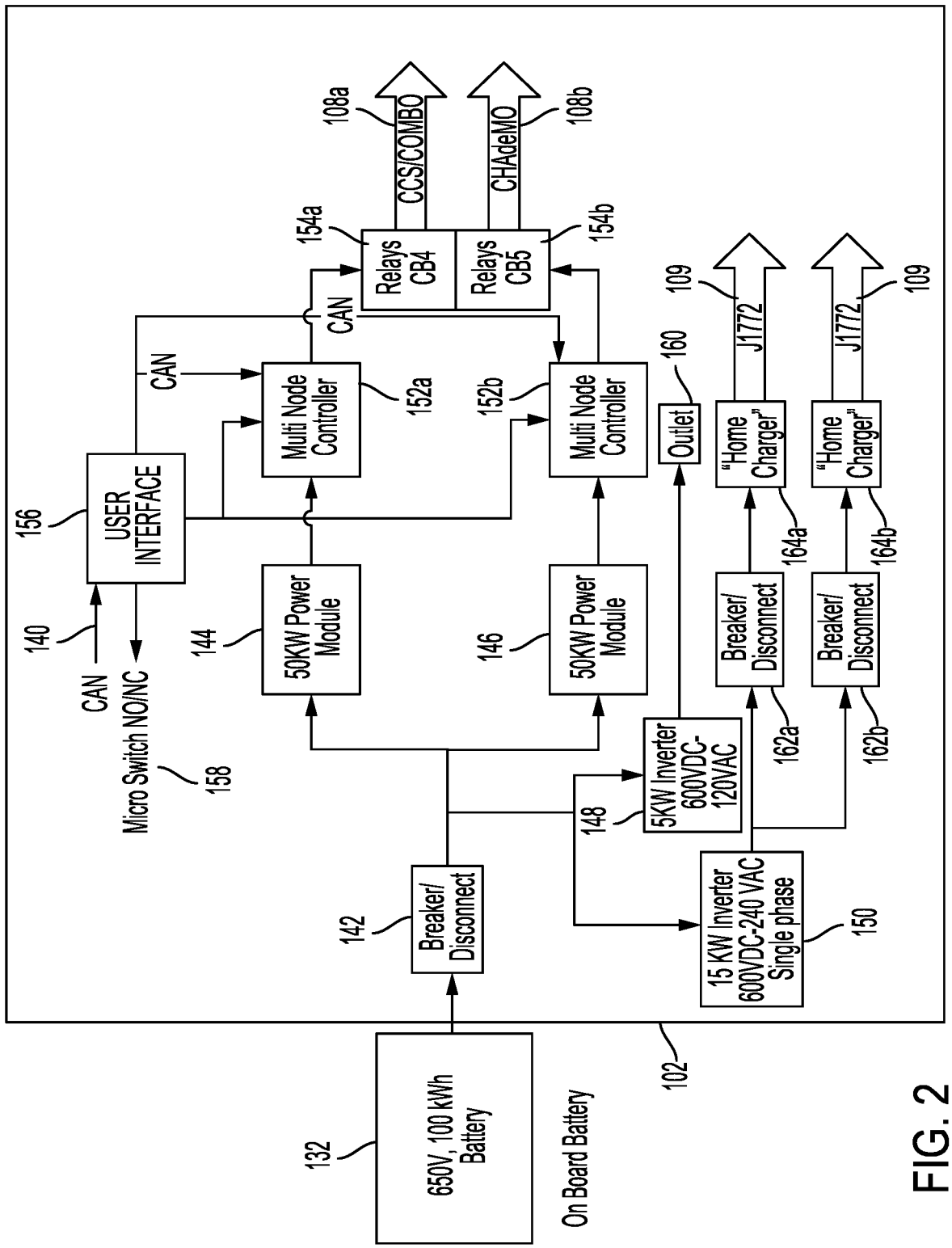
FIG. 2 is a schematic diagram of the integrated charging system of FIG. 1 in accordance with embodiments of the present disclosure.

FIG. 2 shows a configuration of the integrated charging system 102 illustrated in FIG. 1 according to an embodiment. In the illustrated embodiment, the charging system 102 receives a DC current from the rechargeable energy storage supply 132 of the electric vehicle 100. In another embodiment, the charging system 102 receives the DC current from the power distribution unit 126. Other suitable power sources, such as an independent or integrated battery and/or generator, can also be used to transmit the DC current to the charging system 102.

Included in the charging system 102 is a circuit breaker or disconnect system 142 configured to selectively transmit the received DC current to one or more electric modules 144, 146, 148, 150. Although the four modules 144, 146, 148, 150 are shown, any number (e.g., two, three, six, etc.) of the electric modules is contemplated to suit different applications. In one example, the circuit breaker 142 is configured to selectively distribute electric power of the received DC current to at least one of the electric modules 144, 146, 148, 150. In FIG. 2, the electric modules 144 and 146 (or 148 and 150) are electrically connected to circuit breaker 142 in parallel formation. Other suitable configuration, such as a serial connection, can be contemplated. In this example, each of the modules 144, 146 can be a power module capable of supplying approximately 50 kilowatts (kW).

In one embodiment, the electric module 144 is a first electric module and the electric module 146 is a second electric module. In this example, the first electric module 144 can be a 50 kW DC-to-DC inverter configured to convert a DC current to another DC current (e.g., from 650 VDC to 400 VDC or 500 VDC). In another embodiment, one or more of electric modules can be DC-to-AC inverters to suit different applications. The first electric module 144 is configured to receive the DC current from the circuit breaker 142, convert it into another DC current, and transmit the converted DC current to a first node controller 152a. Node controllers 152a, 152b are configured to control an electric current flow on one or more circuit nodes in the charging system 102 based on a control signal received from the controller 134 via the communication link 136 and/or CAN 140. For example, the first node controller 152a is configured to receive the DC current from first electric module 144 and selectively transmit the DC current to a first relay switch 154a. The first relay switch 154a is configured to transmit the DC current to a first electrical connector 108a for performing the power charging process. For example, the electric vehicle 104 can be connected to the first electrical connector 108a for charging using a CCS connector.

Similarly, the second electric module 146 can be another 50 kW DC-to-DC inverter configured to convert a DC current to another DC current. The second electric module 146 is configured to receive the DC current from the circuit breaker 142, convert it into another DC current, and transmit the converted DC current to a second node controller 152b. For example, the second node controller 152b is configured to receive the DC current from the second electric module 146 and selectively transmit the DC current to a second relay switch 154b. The second relay switch 154b is configured to transmit the DC current to a second electrical connector 108b for performing the power charging process. For example, the electric vehicle 104 can be connected to the second electrical connector 108b for charging using a CHAdeMO plug.

In various embodiments, to aid controlling of the first and second node controllers 152a, 152b, the charging system 102 includes an interface module 156 configured to receive the control signal from the controller 134 via the communication link 136 and/or CAN 140. As discussed above, the control signal is used to control the electric current flow on one or more circuit nodes in the charging system 102. Additionally, interface module 156 can be connected to a safety switch 158 to turn on or off the first and second node controllers 152a, 152b as desired during operation. Other modules, such as the modules 144, 146, 148, and 150, can also be controlled by the interface module 156 to suit different applications.

In one embodiment, the electric module 148 is a third electric module and the electric module 150 is a fourth electric module. In this example, third electric module 148 can be a 5 kW DC-to-AC inverter configured to convert a DC current to an AC current (e.g., from 600 VDC to 120 VAC or 240 VAC). In another embodiment, one or more of the electric modules can be DC-to-DC inverters to suit different applications. The third electric module 148 is configured to receive the DC current from the circuit breaker 142, convert it into the AC current (e.g., 120 VAC), and transmit the converted AC current to an outlet 160. For example, the outlet 160 can be configured to deliver the AC current to one or more electric devices 106 using J1772 plugs.

Similarly, the fourth electric module 150 can be a 15 kW DC-to-AC inverter configured to convert a DC current to the AC current. The fourth electric module 150 is configured to receive the DC current from the circuit breaker 142, convert it into the AC current (e.g., 240 VAC), and selectively transmit the converted AC current to one or more other circuit breakers 162a, 162b. The circuit breakers 162a, 162b are configured to selectively transmit the AC current received from the fourth electric module 150 to one or more charger 164a, 164b. For example, each charger 164a, 164b can be configured to deliver the AC current to the one or more electric devices 106 using the J1772 plugs.

Any of these modules can be controlled to deliver full rated or partial power based on a desired priority of the vehicle or device being charged. This priority can change real time with inputs from a local operator or through a bidirectional telematic link, using cellular data or Wi-Fi transmissions. The power level allowed can be controlled by the vehicle powertrain controller, such as the controller 134. The power level in the case of DC-to-AC conversion can be communicated to the electrified vehicle or electric energy storage on-board device setting the electric power draw. This may be done by altering the standard pilot signal in the standard SAE J1772 or J3068 connection but can be communicated in other suitable ways to the target vehicle or device, such as the electric vehicles 104 and the electric devices 106.

In addition to a remote control, the telematic link can be used to monitor the vehicle with the charging system 102 that is integrated, and the target vehicles/devices being charged. Signals being monitored include but are not limited to a charging vehicle's battery State of Charge, a liquid fuel level, an internal component temperature, a fault status and a remaining time to fully charge the target vehicles/devices.

In any of the embodiments and examples discussed herein, it may be desired to have an EV, HEV and/or PHEV vehicle connect to an AC power line and transfer electric power from the vehicle to the AC power line—as well as to transfer power from the AC power line to the vehicle. In other embodiments, it may be desired to have an EV, HEV and/or PHEV vehicle connect to a DC power line and transfer electric power from the vehicle to the DC power line—as well as to transfer power from the DC power line to the vehicle. In one example, power utility companies own and operate fleets of vehicles to dispatch to the field and repair, install and/or replace parts of the power lines and/or grid.

In many aspects of the present application, vehicles and/or systems are disclosed that may be able to control the power generation at a higher energy efficiency for energy transfer from "on-board" vehicle liquid or carbon based fuel to electric energy (e.g., possibly to a power grid) and possibly, while maintaining the State of Charge (SOC) of the main vehicle traction energy storage battery. This higher energy efficiency may allow the mobile power platform (e.g., the engine and/or the vehicle chassis) to transfer high power. In one aspect, this may be possible by avoiding the typical high heat rejection of a standard internal combustion engine—e.g., usually because of the inefficient control of engine power (e.g., throttling) or the use of a single generator.

In one aspect, a vehicle may be designed with a large enough battery pack to store enough energy to allow leveling the load from a "prime mover" (e.g., an Internal Combustion (IC) engine, a fuel cell, a Compressed Natural Gas (CNG) engine or any other engine/mover that may rely on a fuel source other than electricity, like gasoline, natural gas, any other carbon-based fuel or any liquid fuel). It will be appreciated that any mention of one of these types of engines/movers herein also applies to other engines/movers of this description. Due to the large traction battery of PHEV designs, it may be desirable and/or possible to operate the engine at a much higher efficiency and thus incurring much less heat rejection by using the batteries to absorb and deliver continuous power to the load.

It should be understood that the connecting lines shown in the various figures contained herein are intended to represent functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Various modifications and additions can be made to the exemplary embodiments discussed without departing from the scope of the presently disclosed subject matter. For example, while the embodiments described above refer to particular features, the scope of this disclosure also includes embodiments having different combinations of features and embodiments that do not include all of the described features. Accordingly, the scope of the subject matter disclosed herein is intended to embrace all such alternatives, modifications, and variations as fall within the scope of the claims, together with all equivalents thereof.

What is claimed is:

1. A method of charging one or more electric energy storage devices, the method comprising:
    receiving, by a charging system installed on-board an electric vehicle, electric power generated by a powertrain used for propulsion of the electric vehicle;
    converting the electric power received from the powertrain into an electric current capable of charging one or more electric energy storage devices located external to the electric vehicle; and
    charging the one or more electric energy storage devices located external to the electric vehicle using the converted electric current, wherein the powertrain is capable of both (1) facilitating propulsion of the electric vehicle and (2) charging one or more additional electric vehicles.

2. The method of claim 1, wherein the one or more electric energy storage devices comprise one or more batteries.

3. The method of claim 1, further comprising exporting the electric power generated by the powertrain of the electric vehicle to a power grid system located external to the electric vehicle.

4. The method of claim 1, wherein charging the one or more electric energy storage devices is performed while the electric vehicle is in operation.

5. The method of claim 1, wherein charging the one or more electric energy storage devices is performed while the electric vehicle is in a stationary condition.

6. The method of claim 1, further comprising controlling the electric current to the one or more electric energy storage devices by limiting the electric current charged to at least one of the one or more electric energy storage devices.

7. The method of claim 6, further comprising determining how to control the electric current based on at least one of: thermal limits, real-time conditions of components, charge priority of connected devices, time limits of charge opportunity, energy capacities, maximum life of components, noise considerations, and emissions considerations.

8. The method of claim 1, further comprising:
converting the electric power received from the powertrain into an electric current capable of charging the one or more additional electric vehicles; and
charging the one or more additional electric vehicles based on the converted electric current.

9. The method of claim 8, further comprising:
receiving state of charge (SOC) information of the one or more additional electric vehicles; and
based on the SOC information, prioritizing charging times or power levels to one of the one or more additional electric vehicles that has a lowest SOC or a priority charging status.

10. The method of claim 8, further comprising controlling the electric current to the one or more additional electric vehicles by limiting the electric current to at least one of the one or more additional electric vehicles.

11. The method of claim 10, wherein the electric current is controlled based on information received from a telematics module installed in the electric vehicle.

12. The method of claim 1, further comprising:
controlling the electric current to the one or more electric energy storage devices by limiting the electric current charged to at least one of the one or more electric energy storage devices based on a maximum life of components of the one or more electric energy storage devices or based on noise or emissions considerations of a location where the electric vehicle is operating.

13. A system for performing an electric power charging process for one or more electric energy storage devices, comprising:
a charging system installed on-board an electric vehicle and configured to be electrically connected to the electric vehicle, wherein the charging system is configured to receive electric power generated by a powertrain used for propulsion of the electric vehicle, convert the electric power received from the powertrain into an electric current capable of charging one or more electric energy storage devices located external to the electric vehicle, and charge the one or more electric energy storage devices located external to the electric vehicle using the converted electric current, wherein the powertrain is capable of both (1) facilitating propulsion of the electric vehicle and (2) charging one or more additional electric vehicles.

14. The system of claim 13, further comprising a controller operative to control the electric current to the one or more electric energy storage devices by limiting the electric current charged to at least one of the one or more electric energy storage devices.

15. The system of claim 13, further comprising a telematics module configured to be operatively connected to the electric vehicle, wherein the controller is operative to control the electric current based on information received from the telematics module.

16. The system of claim 13, wherein the charging system is configured to control the electric current to the one or more electric energy storage devices by limiting the electric current charged to at least one of the one or more electric energy storage devices based on a maximum life of components of the one or more electric energy storage devices or based on noise or emissions considerations of a location where the electric vehicle is operating.

* * * * *